United States Patent [19]

Olson

[11] Patent Number: 4,487,244

[45] Date of Patent: Dec. 11, 1984

[54] ROLLER APPARATUS FOR A FLEXIBLE WEB

[76] Inventor: Carl G. Olson, 705 N. Elmhurst Rd., Prospect Heights, Ill. 60070

[21] Appl. No.: 300,165

[22] Filed: Sep. 8, 1981

Related U.S. Application Data

[63] Continuation-in-part of Ser. No. 262,529, May 11, 1981.

[51] Int. Cl.$^3$ .............................................. A47G 5/02
[52] U.S. Cl. ..................................................... 160/238
[58] Field of Search ............... 160/238, 239, 240, 291, 160/298, 299, 305, 307, 319, 321, 323–326, 294, 295; 188/83; 248/330.1, 334.1, 566, 579

[56] References Cited

U.S. PATENT DOCUMENTS

| | | | |
|---|---|---|---|
| 172,211 | 1/1876 | Vreeland | 160/298 |
| 187,422 | 2/1877 | Seehausen | 160/298 |
| 316,771 | 4/1885 | Gerdon | 40/514 |
| 1,223,837 | 4/1917 | Shorys | 160/321 |
| 1,284,828 | 11/1918 | Walby | 40/514 |
| 1,485,838 | 3/1924 | Dietz | 40/514 |
| 1,699,555 | 1/1929 | Williams | 160/298 |
| 1,790,662 | 2/1931 | Manson | 160/298 |
| 2,109,112 | 2/1938 | Manson | 160/298 |
| 2,501,371 | 3/1950 | Ayelt | 160/239 |
| 2,506,209 | 5/1950 | Glass | 40/514 |
| 2,568,245 | 9/1951 | McDonald | 188/83 |
| 3,489,250 | 1/1970 | Kuhlmann | 188/83 |
| 3,524,491 | 8/1970 | Olson | 160/393 |
| 4,009,746 | 3/1977 | Otterbeck | 160/323 R |
| 4,393,915 | 7/1983 | Olson | 160/384 |

FOREIGN PATENT DOCUMENTS 1455600 12/1963 Fed. Rep. of Germany ........ 40/155
2115368  3/1971 Fed. Rep. of Germany ............. 40/

Primary Examiner—Peter M. Caun
Attorney, Agent, or Firm—Trexler, Bushnell & Wolters, Ltd.

[57] ABSTRACT

A roller apparatus is provided for a flexible web such as a map, chart, window shade or the like which is provided on at least one free margin thereof with an elongated holder element of predetermined cross-sectional dimensions which are substantially greater than the thickness of the flexible webbing material. The roller apparatus comprises a rigid, elongated tubular roll for internally receiving the holder element and including in a peripheral wall thereof a longitudinal through slot of a cross-sectional dimension smaller than that of the holder element and greater than the thickness of the web. An end cap is non-rotatably attached to either end of the tubular roll. One of these end caps is either removably mounted to the tubular roll, or alternatively is provided with a through opening of dimensions at least as great as the cross-sectional dimensions of the holder element and peripherally communicating with the through longtitudinal slot of the tubular roll, for slidably inserting the holder element into the tubular roll with the flexible webbing depending through and below the longitudinal slot. Thus, a plurality of holder elements with flexible webbings depending therefrom are interchangeably slidably insertable into the tubular roll. Moreover, each holder and depending flexible webbing may be inserted from either right-hand or left-hand margins of the flexible webbing so as to selectively reveal either surface of the flexiable webbing with respect to a fixed observer.

15 Claims, 15 Drawing Figures

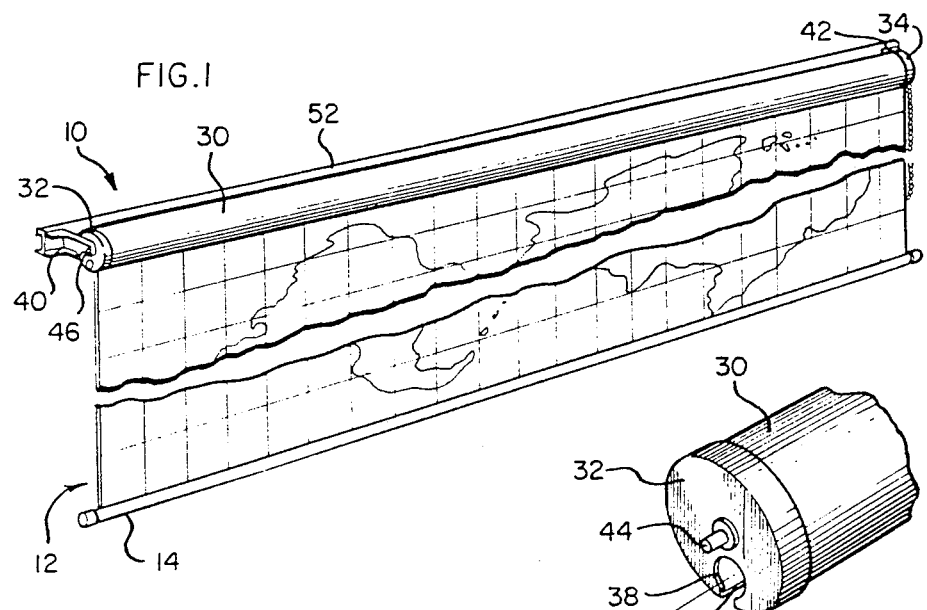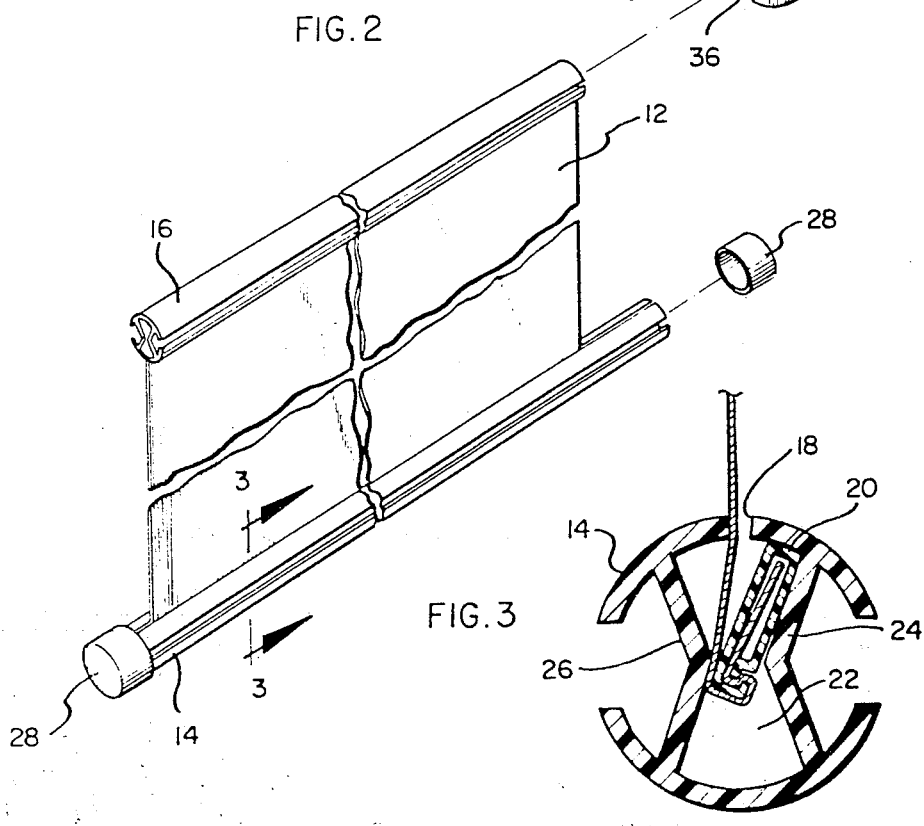

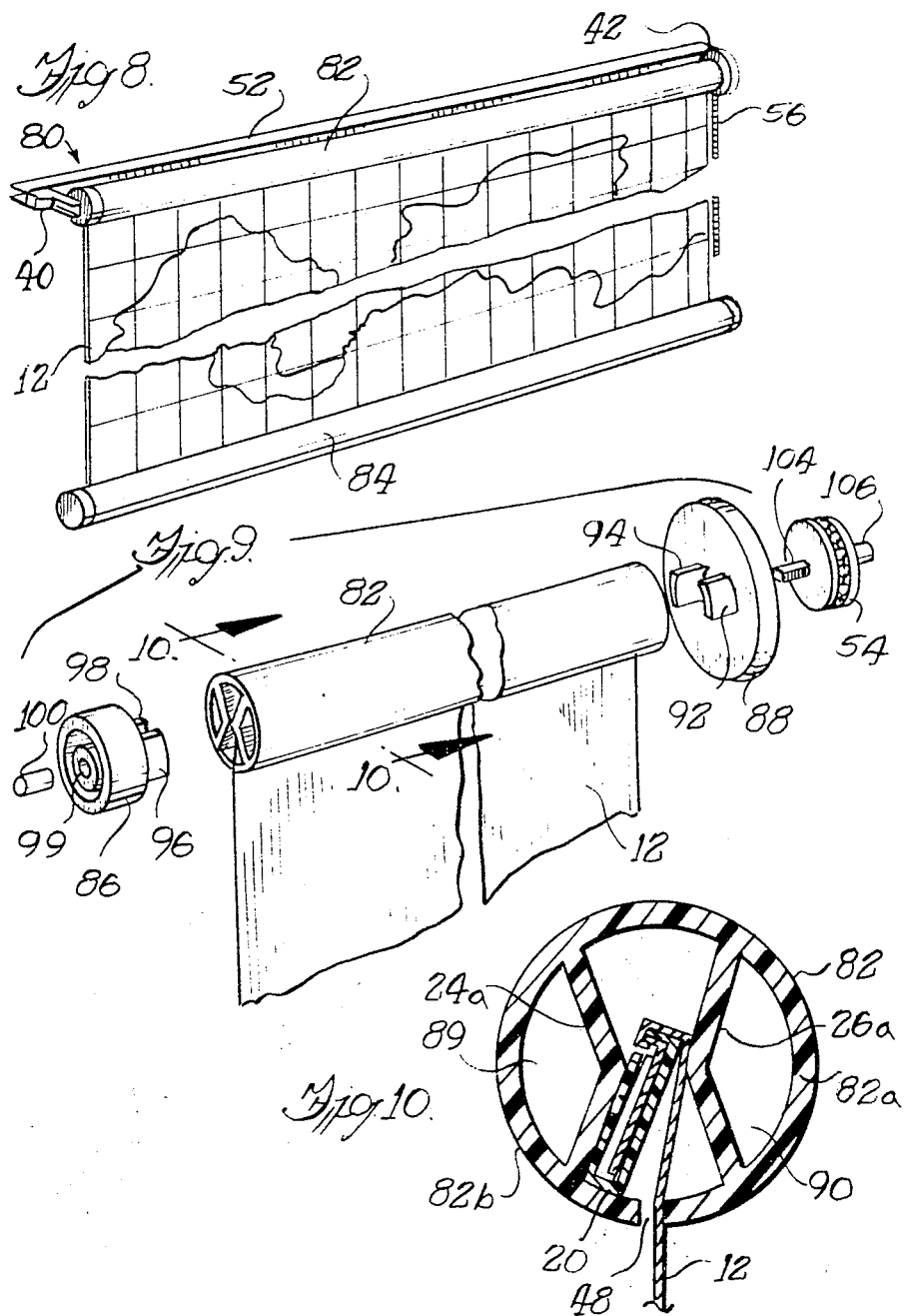

ROLLER APPARATUS FOR A FLEXIBLE WEB

CROSS REFERENCE TO RELATED APPLICATION

This application is a continuation-in-part of my earlier patent application, Ser. No. 262,529, filed May 11, 1981.

BACKGROUND OF THE INVENTION

The present invention relates generally to roller apparatus, and more particularly to roller apparatus for rolling a flexible webbing material such as pull-down window shades, maps, charts or the like.

In the past, such window shades, maps, charts and the like have generally been provided with rollers of the spring-loaded type. The flexible webbing is generally firmly attached to the spring-loaded roller, as by tacking or stapling, for example. Moreover, such rollers are constrained to rolling up the attached webbing in a single direction. Accordingly, should the roller malfunction, the shade or chart generally must be carefully removed to effect repair or replacement of the roller. Additionally, such rollers generally do not permit the chart or window shade attached thereto to be readily removed and replaced with a different chart or shade.

Due to the above-mentioned directional constraint of such rollers, the chart or shade carried upon such a roller may not be reversed so as to reveal both sides thereof to a fixed observer. However, such reversibility is both useful and desirable in the case of window shades or the like having different patterns or finishes at either side thereof. For example, window shades are available having a reflective surface at one side thereof and a semi-transparent, generally tinted surface at the other side thereof. Accordingly, it is often desirable during warm summer months to place the reflective surface toward a window to reflect the sunlight back outwardly and thereby aid in cooling the building. On the other hand, during winter months, it is often desirable to reverse such a window shade so as to admit some amount of sun, and further tend to reflect the heat within the building back inwardly. Such a window shade cannot be reversed in this fashion when attached to a conventional spring-loaded roller device.

In the case of charts, maps or the like, which are generally printed or bear information on but one side, conventional rollers permit rolling up thereof in but a single direction, generally with the printed side out. Accordingly, most maps, charts and the like bear a dust cover device attached to the free end thereof which may be rolled and secured around the chart or map when fully rolled on the roller to protect the chart or map from dirt, dust or the like. However, provision of a bidirectional roller device can eliminate the need for such a dust cover, by permitting rolling of the chart or map with the unprinted side outwardly, to serve as protection for the printed side thereof. Further in this regard, rolling in either direction also tends to discourage the chart or map from taking a set or curl in response to being carried for periods of time rolled up on the roller.

OBJECTS AND SUMMARY OF THE INVENTION

It is therefore a general object of the present invention to provide a new and improved roller apparatus for a flexible webbing such as pull-down window shades, maps, charts or the like.

A more specific object is to provide such a roller apparatus which does not require permanent attachment of the window shade, map or the like thereto, so as to interchangeably receive a plurality of different shades, charts, maps or the like.

A related object is to provide such a roller apparatus which is rotatable in either direction at all times.

Another object is to provide such a roller apparatus adapted to reversibly receive the chart, map or the like so as to depend therefrom with either surface thereof exposed to a fixed observer.

Briefly, and in accordance with the foregoing objects, a roller apparatus is provided for a flexible web such as a chart. The flexible web is provided on at least one free margin thereof with an elongated web mounting means of predetermined cross-sectional dimensions which are greater than the thickness of said flexible webbing material. The roller apparatus comprises rigid, elongated tubular roll means for receiving said holder element interiorly thereof and including in a peripheral wall portion thereof a longitudinal through slot of a cross-sectional dimension smaller than that of said web mounting means and greater than the thickness of said web. An end cap is non-rotatably mounted to either end of said tubular roll means. Means are provided for permitting slidable insertion of said web mounting means with said flexible webbing affixed thereto into said tubular roll means with said flexible webbing depending through and below said longitudinal slot, whereby said web mounting means and said flexible webbing depending therefrom are slidably insertable into the tubular roll selectively from either right-hand or left-hand margins of said flexible webbing so as to selectively reveal either surface of said flexible webbing with respect to a fixed observer.

BRIEF DESCRIPTION OF THE DRAWINGS

The foregoing as well as other objects, features and advantages of the invention will be more readily appreciated upon consideration of the following description together with the accompanying drawings, wherein:

FIG. 1 is a perspective view of a roller apparatus for a flexible web, in accordance with the present invention;

FIG. 2 is an exploded perspective view, partially cut away, showing additional detail of the apparatus of FIG. 1;

FIG. 3 is a sectional view illustrating a web securing device useful with the apparatus of FIGS. 1 and 2;

FIG. 8 is a perspective view of an alternate embodiment of a roller apparatus in accordance with the present invention;

FIG. 9 is an exploded perspective view, illustrating further details of the roller apparatus of FIG. 8;

FIG. 10 is a sectional view illustrating a web securing arrangement useful with the roller apparatus of FIGS. 8 and 9;

DETAILED DESCRIPTION OF THE ILLUSTRATED EMBODIMENT

Figure 4:
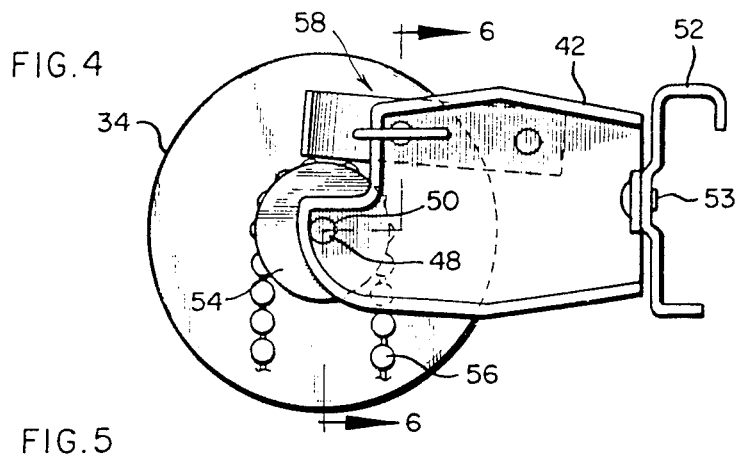
FIG. 4 is an enlarged end view of one end of the roller apparatus of FIG. 1.

Referring now to the drawings and initially to FIG. 1, a roller apparatus in accordance with the invention is designated generally by the reference numeral 10. As illustrated in FIG. 1, this roller apparatus supports a flexible web designated generally by the reference numeral 12. This flexible web 12 may comprise a window shade, map, chart or the like.

Referring also to FIGS. 2 and 3, it will be seen that the flexible webbing 12 is further provided with a pair of web securing devices 14, 16, at top and bottom free margins thereof. These web securing devices 14, 16 are preferably of the configuration and structure shown and described in my copending application Ser. No. 133,346 filed Mar. 24, 1980 for Improved Web Securing Device, now U.S. Pat. No. 4,393,915 which is incorporated herein by reference. Accordingly, these web securing devices need not be described in detail herein.

Suffice it to say that each of the web securing devices 14, 16 comprises an enlongate, tubular element having a longitudinal slot 18 through one outer wall thereof, as best seen in FIG. 3. The longitudinal slot serves to receive the webbing 12 therethrough, which is further secured to an elongated rib member 20 which is held within an hour glass-shaped chamber 22 within the web securing element 14. This hour glass-shaped chamber is formed by a pair of complementary inwardly projecting wall surfaces 24, 26. The web securing device 16 at the remaining or top free margin or edge of the web 12 is substantially identical with the web securing device 14 just described with reference to FIG. 2 and FIG. 3. However, the former web securing device 14 is further provided with a pair of end pieces or caps 28.

The roller apparatus 10 includes a tubular, elongate roll element 30 which has affixed thereto a pair of end caps 32, 34. In the illustrated embodiment, this tubular roll 30 is substantially cylindrical and the end caps 32, 34 are substantially circular cup-shaped members. The tubular roll 30 includes a longitudinal through slot 36, best viewed in FIG. 2, which is generally of a greater cross-sectional dimension than the thickness of the web 12 but of lesser cross-sectional dimension than the thickness of the holder element 16, for receiving the holder element 16 interiorly of the tubular roll 30 with the web 12 depending therefrom through the slot 36. Cooperatively, the end cap 32 includes a generally circular through opening 38 which peripherally communicates with the slot 36 for slidably receiving the web securing device 16 therethrough to be received within the tubular roll 30. Advantageously, this structure permits the web securing element 16 with the web 12 affixed thereto to be slidably inserted and/or removed from the tubular roll 30 by way of the opening 38 of the end cap 32, whereby the flexible webbing may depend from the tubular roll 30 with either surface thereof exposed to a fixed observer standing to one side thereof.

Figure 5:
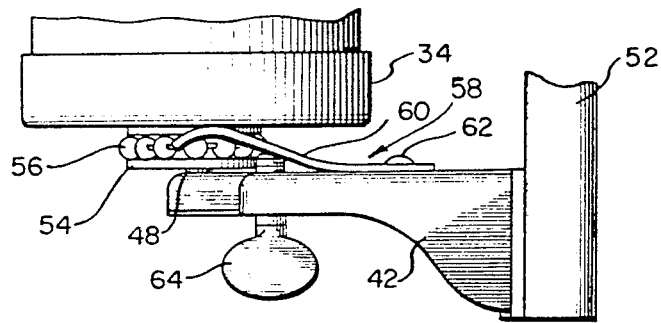
FIG. 5 is a partially cut away top view of the end portion shown in FIG. 4 of the roller apparatus of the invention.
Figure 6:
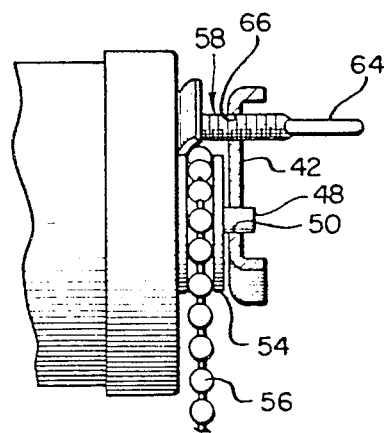
FIG. 6 is a partially cut away front elevation of the end portion of FIG. 4 and taken generally along the line 6—6 of FIG. 4.

Referring to FIG. 1, a pair of conventional mounting brackets 40, 42 are provided for rotatably mounting the tubular roller 30. More particularly, as best viewed in FIG. 2, it will be seen that the end cap 32 is provided with a substantially centrally located shaft stub 44 which may be rotatably mounted to a corresponding bearing aperture or opening 46 in the bracket 40. Referring also to FIGS. 4, 5 and 6 it will be seen that a like shaft 48 is substantially centrally located with respect to the end cap 34 and permits rotatable mounting thereof with respect to a similar bearing aperture or opening 50 in the mounting bracket 42. Additionally, an elongate mounting strip 52, as best viewed in FIG. 1, may also be provided for receiving the mounting brackets 40, 42 with the tubular roll 30 already rotatably mounted thereto, whereby the apparatus of the invention may be provided as a pre-assembled unit so as to be readily mountably on a wall surface, or at a window opening, as desired.

These brackets 40 and 42 may be secured to a wall or window surface or the like to permit mounting of the roller apparatus 10 thereto so that the flexible webbing 12 may be depended therefrom with either surface thereof exposed to the observer standing on one side thereof. For example, as discussed above it is often useful to provide a window shade (as the flexible webbing 12) which has a reflective surface on one side thereof. This reflective surface may be mounted to face a window during summer months when it is desired to reflect sunlight and heat energy away from the house or building, and be reversed during the winter months when it is desired to reflect heat energy back inwardly to the house or building. In accordance with the invention, this is done by slidably removing, and then reversing and re-inserting the web securing device 16 and depending web (shade) 12 with respect to the tubular roller 30.

Reference is again invited to FIGS. 4, 5 and 6 wherein the mounting bracket 42, and cap 34 and associated elements of the invention are illustrated in additional detail. A suitable drive mechanism for selectively rotating the tubular roll 30 in either direction is provided, and in the illustrated embodiment takes the form of a pulley 54 driven by a suitable endless flexible loop member such as a chain 56. In the illustrated embodiment this pulley 54 is circumferentially slotted or otherwise formed to receive the links or ball elements forming the chain 56 to ensure close mechanical contact therebetween. This pulley 54 is non-rotatably mounted substantially centrally with respect to the end cap 34 and mounts at the outer surface thereof the shaft 48 described above. Advantageously, the rotatable mounting of the tubular roll 30 with respect to the end brackets 40 and 42 permits rolling of the tubular roll 30 in either direction (clockwise or counterclockwise as viewed in FIG. 4) to achieve rolling of the depending flexible webbing 12 upon the outer surface of the tubular roll 30. In this regard, it will be recognized that many maps, charts or the like are printed on but one surface thereof whereby rolling in one direction will cause the chart or map 12 to be rolled upon the external surface of the tubular roll 30 with the printed side to the inside, thereby protecting it against dirt, dust or the like when not in use. Accordingly, a separate dust cover as provided in many prior art charts or maps need not be provided with the roller apparatus of the present invention.

Referring still to FIGS. 4, 5 and 6, and in accordance with a further aspect of the invention, an adjustable drag assembly designated generally by the reference numeral 58, is also provided at the end bracket 42. In the illustrated embodiment this drag assembly includes a substantially flat, elongate member of a hardened, spring-steel material which has been preformed into a relatively shallow, substantially S-shape, as best viewed in FIG. 5. This spring member 60 is affixed at one end thereof to the bracket 42 by means of a suitable fastener such as a rivet 62. The oppositely curved end of the spring member 60 thus extends inwardly of the bracket 42 for engagement with the outer surface of the end cap 34. Cooperatively, a suitable adjustable member such as a thumb screw 64 is threadably advanceable and retractabe with respect to a receiving threaded aperture 66 also formed in the bracket 42. In the illustrated embodiment, this thumb screw 64 and its receiving threaded opening 66 are spaced apart from the secured end (at fastener 62) of the spring member 60 so as to bear against the mid portion thereof. This in turn causes the free end of the spring member 60 to bear against the end surface of the end cap 34. Advantageously, then, the thumb screw 64 may be selectively advanced or retracted with respect to the bracket 42 for providing the desired amount of bearing force or friction between the spring member 60 and end cap 34. Accordingly, an adjustable amount of drag is provided for opposing the rotation of the tubular roll 30 in response to actuation of the drive means comprising the chain 56 and pulley 54. When the flexible webbing 12 is completely rolled upon the outer surface of the tubular roll 30, this drag assembly comprising the spring 60 and thumb screw 64 may be tightened to substantially prevent unrolling thereof.

Figure 7:
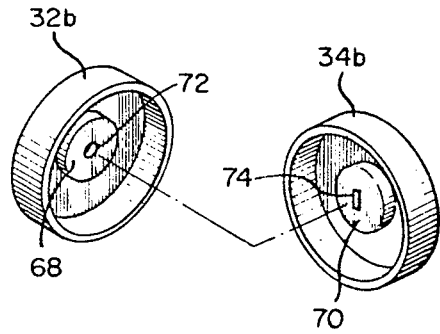
FIG. 7 is a perspective view of a pair of end caps useful in an alternate embodiment of the roller apparatus of the invention.

Referring now to FIG. 7, alternate structures for the end caps 32 and 34 are designated by reference numerals 32b and 34b. It may be desirable in some cases to utilize the tubular roll member 30 merely as a casing or housing for a conventional spring-mounted window shade, chart or the like. In such instances, the end caps 32b and 34b may be readily substituted for the end caps 32 and 34 and assembled with the tubular roll 30. To this end, the end caps 32b and 34b include, interiorly thereof, suitable mounting structures for receiving the respective ends of a conventional spring-loaded roller. Each of these mounting structures includes an inwardly extending cupshaped member 68, 70 which are respectively provided with a circular slot 72 and a substantially rectangular slot 74 to receive the ends of a conventional spring-loaded roller.

Reference is next invited to FIGS. 8 through 15 wherein an alternative form of roller apparatus in accordance with the invention is illustrated.

Referring initially to FIG. 8, this alternative form of roller apparatus is indicated generally by the reference numeral 80. As with the embodiment of FIGS. 1 through 6, this roller apparatus 80 supports a flexible webbing 12, which may comprise a window shade, map, chart or the like. A pair of generally cylindrical web-securing devices 82, 84 provided at the top and bottom free margins of the flexible webbing 12 and are substantially similar to the web-securing devices 14, 16 illustrated and described above with reference to FIGS. 1 through 3. Departing from the embodiment of FIGS. 1 through 6, however, the web-securing device 82 functions as the roller element. That is, the cylindrical, tubular roll member 30 and its associated end caps 32, 34, shown in FIG. 1, are not utilized in the embodiment of FIGS. 8 through 15. Rather, and with reference also to FIGS. 9 and 10, the cylindrical web-securing device 82 functions as a tubular roll upon which the webbing 12 may be rolled.

In this regard, and with reference to FIG. 10, the flexible webbing 12 is secured to the elongated rib member 20, which is slidably insertable with respect to the web-securing device or tubular roll 82. This rib member 20 and its cooperation with the roll 82 are more fully described in my aforementioned copending application, Ser. No. 133,346, filed Mar. 24, 1980, now U.S. Pat. No. 4,393,915, for Improved Web Securing Device. The structure of FIG. 10 is substantially similar, therefore, to the structure illustrated and described above with reference to FIG. 3. However, the tubular element 82 of FIG. 10 is provided with but a single through slot 18 through which the webbing 12 depends, and otherwise has a substantially continuous, cylindrical peripheral wall surface, not punctuated by apertures as illustrated above in FIG. 3.

Referring again to FIG. 9, a pair of end caps 86, 88 are configured for attachment to either end of the tubular member 82. These end caps 86, 88 may also be viewed in FIGS. 14-15 and FIGS. 12-13, respectively. In this regard, it will be seen that outer peripheral wall portions 82a, 82b and inwardly projecting wall surfaces 24a, 26a of the tubular element 82 define therebetween a pair of slots or apertures 89, 90. Cooperatively, each of the end caps 86, 88 includes a pair of inwardly projecting parts or legs 92, 94 and 96, 98 which have radially outer wall surfaces of like curvature and relative spacing to the interior surfaces of each of peripheral wall portions 82a and 82b. Moreover, the extent or arc defined by each of these legs 92, 94 and 96, 98 is similar to the arc defined in the respective peripheral wall surfaces 82a, 82b between the respective junctions thereof with the interior or inwardly projecting wall surfaces 24a, 26a. Accordingly, the legs 92, 94 and 96, 98 serve to locate and mount the respective end caps 86, 88, as by a smug telescopic friction fit within the openings or slots 88, 90 at the respective ends of the tubular element 82.

Figure 14:
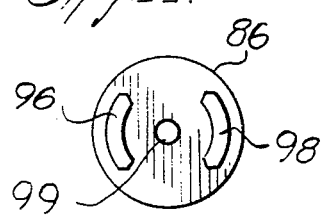
FIG. 14 is a side elevation of a second end cap useful with the roller apparatus of FIGS. 8 through 11.
Figure 15:
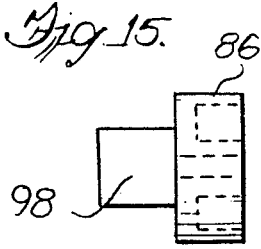
FIG. 15 is an edge view of the end cap of FIG. 14.

In the illustrated embodiment, and as also shown in FIGS. 14 and 15, the end cap 86 is generally cylindrical in configuration and is of substantially the same diameter as the cylindrical web-securing device or tubular roll 82. This end cap 86 is also provided with a centrally located aperture 99 on the axially outer surface thereof for receiving a cylindrical shaft 100. This shaft 100 may be rotatably mounted with respect to an end bracket 40, which together with a similar, opposite end bracket 42 and elongate mounting strip 52 may provide a mounting assembly for the roller apparatus of the invention, in similar fashion to the like assembly described above with reference to FIG. 1.

Figure 11:
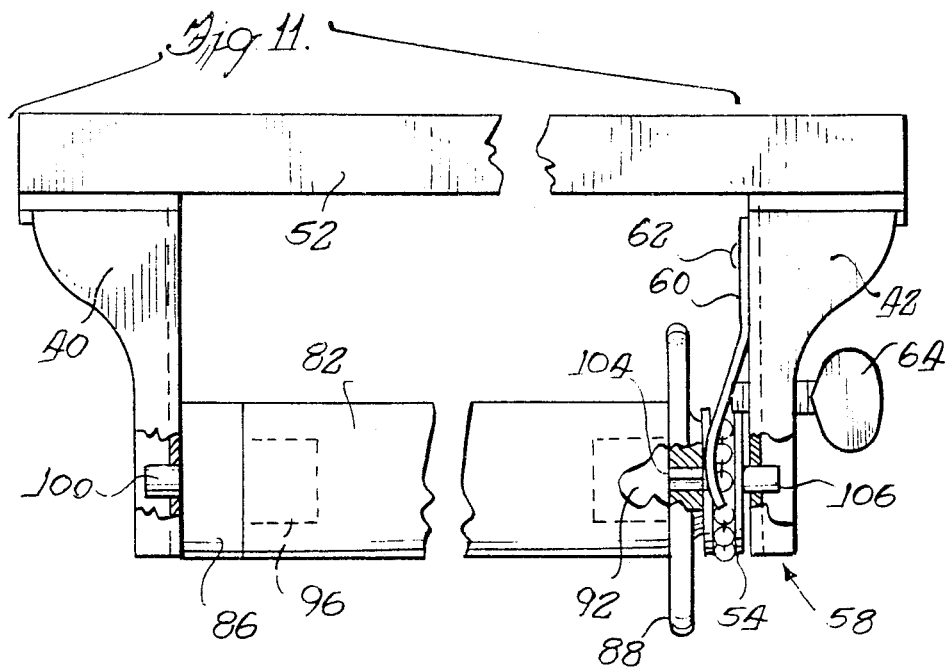
FIG. 11 is an enlarged top or plan view, partially cut away, illustrating further details of the roller apparatus of FIG. 8.
Figure 12:
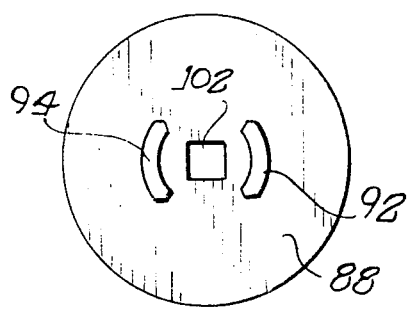
FIG. 12 is a side elevation of an end cap useful with the roller apparatus of FIGS. 8 through 11.
Figure 13:
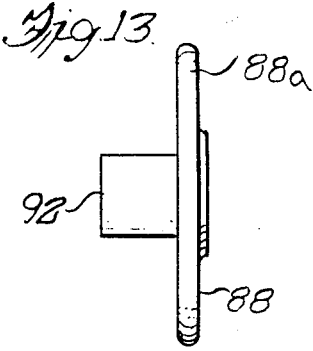
FIG. 13 is an edge view of the end cap of FIG. 12.

As also shown in FIGS. 12 and 13, the end cap 88 comprises a disc-shaped member of substantially greater diameter than the tubular or cylindrical member 82. This disc-shaped end cap 88 thus defines a radially outwardly extending skirt portion 88a which, as will be seen later with reference to FIG. 11, cooperates with a drag or braking assembly 58 to control rotation of the roller member and rolling of the flexible webbing 12 thereon. Additionally, the end cap 88 includes a centrally located aperture 102 which is non-round and, in the illustrated embodiment, square in configuration for receiving a complementary, and preferably square, shaft portion 104 of a pulley member 54, as best viewed in FIGS. 9 and 11.

This pulley member 54 is substantially identical with the pulley 54 illustrated and described above with reference to FIGS. 4 through 6. Briefly, the pulley member 54 includes the square shaft portion 104 for non-rotatable mounting with the square aperture 102 of the end cap 88. The opposite end of this pulley member 54 includes a round shaft member 106 to be rotatably mounted with respect to the end bracket 42. An endless flexible loop such as a chain 56 is looped over the pulley 54 to accomplish rotation of the roller apparatus of the invention, in the same fashion illustrated and described above with reference to FIGS. 4 through 6.

Additionally, and referring to FIG. 11, a drag or braking assembly, designated generally by the reference 58, is also provided. This drag assembly 58 is substantially identical with the drag assembly 58 illustrated and described above with reference to FIGS. 4, 5 and 6. Briefly, a generally S-shaped spring member 60 is affixed by suitable means such as a rivet 62 to an inner sidewall portion of the bracket 42. The opposite end of this spring member extends inwardly of the bracket 42 for engagement with an outer surface of the skirt portion 88a of the end cap 88. A suitable thumb screw 64 is threadably advanceable and retractable with respect to an aperture 66 in the bracket 42 for selectively urging the free end of the spring member 60 to bear against the end surface 88a of the end cap 88 with the desired amount of force.

In operation, the tubular web-securing member 82 of the embodiment of FIGS. 8 through 15 functions as the tubular roll member, upon which the flexible webbing 12 may be suspended and/or rolled. The end caps 86 and 88 configured as illustrated and described above permit the tubular member 82 to function in this fashion, substantially eliminating the need for the cylindrical tube or roll member 30 described above with reference to FIGS. 1 through 6. Functionally, however, it will be seen that the flexible webbing 12 secured to the elongated rib member 20 may readily be slidably inserted or removed with respect to the tubular member 82, by the simple expedient of removing the end cap 86 from one end of the tubular member 82. Preferably, the opposite end cap 88 is glued or otherwise non-removably secured to the opposite end of the tubular member 82. It will be recognized, of course, that removal of the end cap 86 in this fashion requires that the roller assembly be temporarily disengaged at least from the end bracket 40 to permit access to the end cap 86. Hence, the flexible webbing 12 may be reversed with respect to the roller assembly 82 to expose the opposite face thereof to a fixed observer. Alternatively, a different flexible webbing, such as a chart, map or the like, also secured to an elongated rib member 20, may be readily substituted by temporary removal of the end cap 86 in the same fashion. Preferably, these end caps 86 and 88 are formed from a suitable durable plastics material such as ABS material.

For accommodating most shades, maps, charts or the like, the extruded plastic configuration of the tubular member 82, and relative strength provided by the ribs or inner wall members 24a, 26a, provide adequate support to use this tubular member 82 as the roller part of the roller assembly 80. In the case of relatively large charts, maps of the like, the larger diameter and somewhat more rigid metal tubular roll 30 of the first embodiment might be preferred.

What has been shown and described herein is a novel and improved roller apparatus for a flexible webbing. While the invention has been illustrated and described herein with reference to specific embodiments, the invention is not limited thereto. On the contrary, those skilled in the art may devise various alternatives, changes and modifications upon reading the foregoing descriptions, and the invention is intended to include such changes, alternatives and modifications insofar as they fall within the spirit and scope of the appended claims.

The invention is claimed as follows:

1. A roller apparatus for a flexible web such as a chart, said flexible web being provided on at least one free margin thereof with an elongated web mounting means of predetermined cross-sectional dimensions which are greater than the thickness of said flexible webbing material, said roller apparatus comprising: rigid, elongated tubular roll means for receiving and mounting said web mounting means interiorly thereof and including in a peripheral wall portion thereof a longitudinal through slot of a cross-sectional dimension smaller than that of said web mounting means and greater than the thickness of said web, an end cap mountable to either end of said tubular roll means, means removably mounting at least one of said end caps to said tubular roll means and including releasable telescopic engagement means between said one end cap and an adjacent end portion of the tubular roll means independent of the interior mounting of the web mounting means to provide for rotation of said one end cap in unison with the tubular roll means when assembled and, upon removal of said one end up, for permitting slidable insertion of said web mounting means with said flexible webbing affixed thereto into said tubular roll means with said flexible webbing depending through and below said longitudinal slot, whereby said web mounting means and said flexible webbing depending therefrom are slidably insertable into the tubular roll means selectively from either right-hand or left-hand margins of said flexible webbing so as to selectively reveal either surface of said flexible webbing with respect to a fixed observer.

2. An apparatus according to claim 1 and further including first and second bracket means for rotatably mounting said roll means, one of said end caps further having centered shaft means thereon for rotatable mounting with said first bracket means.

3. An apparatus according to claim 2 wherein the other of said end caps mounts bidirectional drive means, said bidirectional drive means being rotatably engaged with said second bracket means for selectively rotating said roll means relative to said bracket means to effect rolling of said flexible webbing material in either direction upon said roll means.

4. An apparatus according to claim 2 or claim 3 wherein one of said first and second bracket means further includes adjustable drag means for imparting a selectable amount of drag to the associated end cap during rotation of said roll.

5. An apparatus according to claim 4 wherein said adjustable drag means comprises a substantially flat, elongate spring member affixed at one end thereof to said one bracket means, screw means threadably received on and through said one bracket means at a position intermediate the ends of said spring member and advanceable and retractable with respect to said one bracket means and said spring member so as to bear against an intermediate portion of said spring member, thereby urging the free end of said spring member to bear against a surface of the associated end cap.

6. An apparatus according to claim 3 wherein said drive means comprises pulley means non-rotatably affixed said other of said end caps and a flexible loop member looped around said pulley means for selectively driving said roller to rotate in either direction.

7. An apparatus according to claim 1 wherein said roll means comprises a substantially cylindrical member, said peripheral wall thereof being continuous circumferentially from one edge of said longitudinal through slot to the other edge thereof, and rib means interiorly of said cylindrical member and extending substantially the entire length thereof, said rib means having substantially the cross-sectional shape of an hourglass, for mounting therebetween said web mounting means, said web mounting means comprising an elongated mounting strip to which the free margin of flexible webbing material may be affixed and said interior rib means being substantially continuous and extending inwardly from the interior surface of said peripheral wall so as to define therebetween a pair of substantially symmetrical wedge-shaped openings extending substantially the length of said tubular member and telescopically receiving therein the adjacent releasable engagement means of said one end cap.

8. An apparatus according to claim 7 wherein said end caps each comprise a cap member having a pair of generally arcuately shaped protruding leg portions of generally complementary shape to at least a portion of said wedge-shaped openings for frictional engagement therebetween to define said means for removably mounting said end caps to said tubular roll member.

9. An apparatus according to claim 8 wherein one of said end caps comprises a substantially cylindrical member of substantially similar diameter to said tubular roll member having a central aperture for receiving cylindrical shaft means for rotatable engagement with said end bracket means.

10. An apparatus according to claim 9 wherein the other of said end caps comprises a substantially disc-shaped member having a radially outwardly extending skirt portion of substantially greater diameter than said tubular roll means.

11. An apparatus according to claim 10 wherein said other end cap further includes a substantially centrally located non-round aperture for non-rotatably receiving pulley means, said pulley means including a pulley member having at one end thereof a square shaft portion for mounting to said other end cap and at the other end thereof a substantially cylindrical shaft member.

12. An apparatus according to claim 1 wherein said tubular roll means includes interior rib means extending substantially the entire length thereof and presenting an hour glass cross-sectional shape for mounting said web mounting means with the external surfaces of said rib means defining internal recesses with the internal surfaces of said tubular roll means, and wherein the engagement means carried by the said one end cap comprises spaced legs frictionally engaging cooperating inner surfaces of said recesses.

13. An apparatus according to claim 12 wherein the spaced legs are complementally shaped to an internal surface portion of a corresponding recess.

14. An apparatus according to claim 13 wherein the legs snugly fit against the internal surfaces of said recesses where the rib means joins the tubular roll means.

15. An apparatus according to claim 14 wherein the opposite end cap includes similar legs fitting against the internal surface of the recesses at the opposite end of the tubular roll means to provide a drive connection therefor.

* * * * *